US007764506B2

(12) United States Patent  
Sullivan

(10) Patent No.: US 7,764,506 B2  
(45) Date of Patent: Jul. 27, 2010

(54) SYSTEMS AND METHODS FOR PROVIDING A DYNAMICALLY MODULAR PROCESSING UNIT

(76) Inventor: Jason A. Sullivan, 241 Mansell Dr., Youngstown, OH (US) 44505

( * ) Notice: Subject to any disclaimer, the term of this patent is extended or adjusted under 35 U.S.C. 154(b) by 899 days.

(21) Appl. No.: 11/483,956

(22) Filed: Jul. 10, 2006

(65) Prior Publication Data

US 2009/0257179 A1    Oct. 15, 2009

Related U.S. Application Data

(62) Division of application No. 10/691,114, filed on Oct. 22, 2003, now Pat. No. 7,075,784.

(60) Provisional application No. 60/420,127, filed on Oct. 22, 2002, provisional application No. 60/455,789, filed on Mar. 19, 2003.

(51) Int. Cl.
   *H05K 5/00* (2006.01)
(52) U.S. Cl. .................. 361/730; 361/752; 361/800
(58) Field of Classification Search ................ 361/730, 361/752, 800, 790, 797
   See application file for complete search history.

(56) References Cited

U.S. PATENT DOCUMENTS

| | | | |
|---|---|---|---|
| 3,787,818 A | 1/1974 | Arnold et al. | |
| 4,232,356 A | 11/1980 | Saunders et al. | |
| 4,791,531 A | * 12/1988 | Jessup | ........................ 361/736 |
| 4,814,970 A | 3/1989 | Barbagelata et al. | |
| 4,816,993 A | 3/1989 | Takahashi et al. | |
| 4,876,644 A | 10/1989 | Nuechterlein et al. | |
| 5,136,718 A | 8/1992 | Haydt | |
| 5,227,957 A | 7/1993 | Deters | |
| 5,311,397 A | 5/1994 | Harshberger et al. | |
| 5,377,356 A | 12/1994 | Molyneaux | |
| 5,504,918 A | 4/1996 | Collette et al. | |

(Continued)

FOREIGN PATENT DOCUMENTS

EP    0 852 350 A2    7/1998

(Continued)

OTHER PUBLICATIONS

M.A. Rybakiov, "Anatomy of Personal Computer," pp. 49-57, and 210, Intermechanics 1990.

*Primary Examiner*—Hung S Bui
(74) *Attorney, Agent, or Firm*—David B. Tingey; Kirton & McConkie

(57) ABSTRACT

Systems and methods for providing a dynamically modular processing unit. A modular processing unit is provided as a platform that is lightweight, compact, and is configured to be selectively used alone or oriented with one or more additional processing units in an enterprise. In some implementations, a modular processing unit includes a non-peripheral based encasement, a cooling process (e.g., a thermodynamic convection cooling process, a forced air cooling process, and/or a liquid cooling process), an optimized circuit board configuration, optimized processing and memory ratios, and a dynamic back plane that provides increased flexibility and support to peripherals and applications. The modular processing unit is customizable and may be employed in association with all types of computer enterprises. The platform allows for a plethora of modifications that may be made with minimal impact to the dynamically modular unit, thereby enhancing the usefulness of the platform across all type of application.

14 Claims, 11 Drawing Sheets

U.S. PATENT DOCUMENTS

| | | | |
|---|---|---|---|
| 5,539,616 | A | 7/1996 | Kikinis |
| 5,589,406 | A | 12/1996 | Kato et al. |
| 5,602,721 | A | 2/1997 | Slade et al. |
| 5,671,430 | A | 9/1997 | Gunzinger |
| 5,689,406 | A | 11/1997 | Wood et al. |
| 5,696,983 | A | 12/1997 | Watanabe et al. |
| 5,761,033 | A | 6/1998 | Whilhelm |
| 5,805,474 | A | 9/1998 | Danielson et al. |
| 5,822,608 | A | 10/1998 | Dieffenderfer et al. |
| 5,844,824 | A | 12/1998 | Newman et al. |
| 5,863,211 | A | 1/1999 | Sobotta et al. |
| 5,909,357 | A | 6/1999 | Orr |
| 5,938,757 | A | 8/1999 | Bertsch |
| 5,948,087 | A | 9/1999 | Khan et al. |
| 5,949,644 | A | 9/1999 | Park |
| 5,999,952 | A | 12/1999 | Jenkins et al. |
| 6,021,453 | A | 2/2000 | Klingman |
| 6,035,356 | A | 3/2000 | Khan et al. |
| 6,049,449 | A | 4/2000 | Cranston, III et al. |
| 6,058,011 | A | 5/2000 | Hardt et al. |
| 6,137,686 | A | 10/2000 | Saye |
| 6,153,881 | A | 11/2000 | Castleman |
| 6,157,533 | A | 12/2000 | Sallam et al. |
| 6,157,537 | A | 12/2000 | Cheng |
| 6,216,185 | B1 | 4/2001 | Chu |
| 6,229,700 | B1 | 5/2001 | Liu et al. |
| 6,229,710 | B1 | 5/2001 | Chen |
| 6,246,573 | B1 | 6/2001 | Khan et al. |
| 6,275,922 | B1 | 8/2001 | Bertsch |
| 6,288,893 | B1 | 9/2001 | Faranda et al. |
| 6,304,459 | B1 | 10/2001 | Toyosato et al. |
| 6,307,742 | B1 | 10/2001 | Diaz et al. |
| 6,327,152 | B1 | 12/2001 | Saye |
| 6,351,375 | B1 | 2/2002 | Hsieh et al. |
| 6,370,546 | B1 | 4/2002 | Kondo |
| 6,377,446 | B1 | 4/2002 | Liau |
| 6,446,192 | B1 | 9/2002 | Narasimhan et al. |
| 6,463,519 | B1 | 10/2002 | Yoshida et al. |
| 6,467,009 | B1 | 10/2002 | Winegarden et al. |
| 6,482,042 | B1 * | 11/2002 | Tupper ............. 439/638 |
| 6,490,157 | B2 | 12/2002 | Unrein |
| 6,512,356 | B1 | 1/2003 | Webb |
| 6,512,963 | B1 | 1/2003 | Felde et al. |
| 6,532,152 | B1 | 3/2003 | White et al. |
| 6,574,098 | B2 | 6/2003 | Netzel et al. |
| 6,629,181 | B1 | 9/2003 | Alappat et al. |
| 6,687,128 | B2 | 2/2004 | Tokuhara |
| 6,718,408 | B2 | 4/2004 | Esterberg et al. |
| 6,819,550 | B2 | 11/2004 | Jobs et al. |
| 6,954,850 | B1 * | 10/2005 | Howard et al. ............ 713/1 |
| 7,075,784 | B2 | 7/2006 | Sullivan |
| 7,236,353 | B2 | 6/2007 | Davidson et al. |
| 7,242,574 | B2 | 7/2007 | Sullivan |
| 7,245,497 | B2 * | 7/2007 | Klein et al. ............ 361/752 |
| 7,256,991 | B2 | 8/2007 | Sullivan |
| 7,340,763 | B1 | 3/2008 | Harris |
| 2001/0036840 | A1 | 11/2001 | Jenkins et al. |
| 2001/0048793 | A1 | 12/2001 | Dair et al. |
| 2002/0097555 | A1 | 7/2002 | Smith et al. |
| 2002/0140147 | A1 | 10/2002 | Sandhu et al. |
| 2003/0005073 | A1 | 1/2003 | Yoshizawa et al. |
| 2003/0090878 | A1 | 5/2003 | Merkin |
| 2003/0156383 | A1 | 8/2003 | Jenkins et al. |
| 2004/0268005 | A1 | 12/2004 | Dickie |
| 2008/0304227 | A1 | 12/2008 | Liu et al. |

FOREIGN PATENT DOCUMENTS

| | | |
|---|---|---|
| EP | 1 081 579 A1 | 3/2001 |
| IL | 125630 | 11/2002 |
| JP | 60207398 | 10/1985 |
| JP | 6127268 | 2/1986 |
| JP | 4107717 | 4/1992 |
| JP | 4055169 | 5/1992 |
| JP | 5267873 | 10/1993 |
| JP | 3048044 | 5/1998 |
| JP | 10173349 | 6/1998 |
| JP | 10-270879 | 10/1998 |
| JP | 11068344 | 3/1999 |
| JP | 111143583 | 5/1999 |
| RU | 2066067 | 8/1996 |
| RU | 2084953 | 7/1997 |
| WO | WO 2004/038526 | 5/2004 |
| WO | WO 2004/038527 | 5/2004 |
| WO | WO 2004/038555 | 5/2004 |

* cited by examiner

SYSTEMS AND METHODS FOR PROVIDING A DYNAMICALLY MODULAR PROCESSING UNIT

RELATED APPLICATIONS

This is a divisional application of U.S. patent application Ser. No. 10/691,114 filed Oct. 22, 2003 now U.S. Pat. No. 7,075,784, entitled SYSTEMS AND METHODS FOR PROVIDING A DYNAMICALLY MODULAR PROCESSING UNIT, which claims priority to U.S. Provisional Patent Application Ser. No. 60/420,127 filed Oct. 22, 2002 entitled NON-PERIPHERALS PROCESSING CONTROL UNIT HAVING IMPROVED HEAT DISSIPATING PROPERTIES and to U.S. Provisional Patent Application Ser. No. 60/455,789 filed Mar. 19, 2003 entitled SYSTEMS AND METHODS FOR PROVIDING A DURABLE AND DYNAMICALLY MODULAR PROCESSING UNIT, which are incorporated herein by reference, and is related to co-pending U.S. patent application Ser. No. 10/691,473 filed Oct. 22, 2003, entitled NON-PERIPHERALS PROCESSING CONTROL MODULE HAVING IMPROVED HEAT DISSIPATING PROPERTIES, and to co-pending U.S. patent application Ser. No. 10/692,005 filed Oct. 22, 2003, entitled ROBUST CUSTOMIZABLE COMPUTER PROCESSING SYSTEM, which are incorporated herein by reference.

BACKGROUND OF THE INVENTION

1. Field of the Invention

The present invention relates to systems and methods for providing a dynamically modular processing unit. In particular, the present invention relates to providing a modular processing unit that is configured to be selectively used alone or with similar processing units in an enterprise. In some implementations, each modular processing unit includes a non-peripheral based encasement, a cooling process (e.g., thermodynamic convection cooling, forced air, and/or liquid cooling), an optimized circuit board configuration, optimized processing and memory ratios, and a dynamic back plane that provides increased flexibility and support to peripherals and applications.

2. Background and Related Art

Technological advancements have occurred over the years with respect to computer related technologies. For example, computer systems once employed vacuum tubes. The tubes were replaced with transistors. Magnetic cores were used for memory. Thereafter, punch cards and magnetic tapes were commonly employed. Integrated circuits and operating systems were introduced. Today, microprocessor chips are currently used in computer systems.

The evolution of computer related technologies has included the development of various form factors in the computer industry. One such standard form factor was referred to as Advanced Technology ("AT"), which ran considerably faster than prior systems and included a new keyboard, an 80286 processor, a floppy drive that had a higher-capacity (1.2 MB) than prior systems and a 16-bit data bus.

Over time, improvements were made to the AT form factor that included a change in the orientation of the motherboard. The improvements allowed for a more efficient design of the motherboard by locating disk drive connectors closer to drive bays and the central processing unit closer to the power supply and cooling fan. The new location of the central processing unit allowed the expansion slots to all hold full-length add-in cards.

While the developments increased the processing ability, the techniques have only been marginally effective in their ability to upgrade components as the computer technology advances. In fact, the techniques have become increasingly less desirable as a delivery mechanism for computer technologies. Predictable failure patterns have been identified in terms of operating durability, manufacturing, shipping, and support. The systems generate heat, which requires internal cooling systems that are noisy. Moreover, current computer systems are prone to requiring repair.

Thus, while computer technologies currently exist that are configured for use in processing data, challenges still exist. Accordingly, it would be an improvement in the art to augment or even replace current techniques with other techniques.

SUMMARY OF THE INVENTION

The present invention relates to systems and methods for providing a dynamically modular processing unit. In particular, implementation of the present invention takes place in association with a modular processing unit that is lightweight, compact, and is configured to be selectively used alone or with similar processing units in an enterprise. In some implementations, each modular processing unit includes a non-peripheral based encasement, a cooling process (e.g., thermodynamic convection cooling, forced air, and/or liquid cooling), an optimized circuit board configuration, optimized processing and memory ratios, and a dynamic back plane that provides increased flexibility and support to peripherals and applications.

In one implementation, a dynamically modular processing unit is a cube platform (e.g., a 3½-inch (8.9 cm) cube platform or another size and/or configuration) that utilizes an advanced cooling process (e.g., a thermodynamic cooling model that eliminates any need for a cooling fan, a forced air cooling process and/or a liquid cooling process). The unit also includes a layered motherboard configuration, and optimized processing and memory ratios. The bus architecture of the unit enhances performance and increases both hardware and software stability. A highly flexible back plane provides support to peripherals and vertical applications. Other implementations of the present invention embrace the use of a durable and dynamically modular processing unit that is greater than or less than a 3½-inch cube platform. Similarly, other implementations embrace the use of shapes other than a cube.

Implementation of the present invention provides a platform that may be employed in association with all types of computer enterprises. The platform allows for a plethora of modifications that may be made with minimal impact to the dynamically modular unit, thereby enhancing the usefulness of the platform across all type of applications.

While the methods and processes of the present invention have proven to be particularly useful in the area of personal computing enterprises, those skilled in the art will appreciate that the methods and processes of the present invention can be used in a variety of different applications and in a variety of different areas of manufacture to yield customizable enterprises, including enterprises for any industry utilizing control systems or smart-interface systems and/or enterprises that benefit from the implementation of such devices. Examples of such industries include, but are not limited to, automotive industries, avionic industries, hydraulic control industries, auto/video control industries, telecommunications industries, medical industries, special application industries, and electronic consumer device industries. Accordingly, the systems and methods of the present invention provide massive computing power to markets, including markets that have traditionally been untapped by current computer techniques.

These and other features and advantages of the present invention will be set forth or will become more fully apparent in the description that follows. The features and advantages may be realized and obtained by means of the instruments and combinations provided herein. Furthermore, the features and advantages of the invention may be learned by the practice of the invention or will be obvious from the description, as set forth hereinafter.

BRIEF DESCRIPTION OF THE DRAWINGS

In order to set forth the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to systems and methods for providing a dynamically modular processing unit. In particular, embodiments of the present invention take place in association with a modular processing unit that is lightweight, compact, and is configured to be selectively used alone or oriented with one or more additional processing units in an enterprise. In some embodiments, a modular processing unit includes a non-peripheral based encasement, a cooling process (e.g., thermodynamic convection cooling, forced air, and/or liquid cooling), an optimized layered printed circuit board configuration, optimized processing and memory ratios, and a dynamic back plane that provides increased flexibility and support to peripherals and applications.

Embodiments of the present invention embrace a platform that may be employed in association with all types of computer and/or electrical enterprises. The platform allows for a plethora of modifications that may be made with minimal impact to the dynamic modular unit, thereby enhancing the usefulness of the platform across all types of applications. Moreover, as indicated above, the modular processing unit may function alone or may be associated with one or more other modular processing units in a customizable enterprise to provide enhanced processing capabilities.

Figure 1:
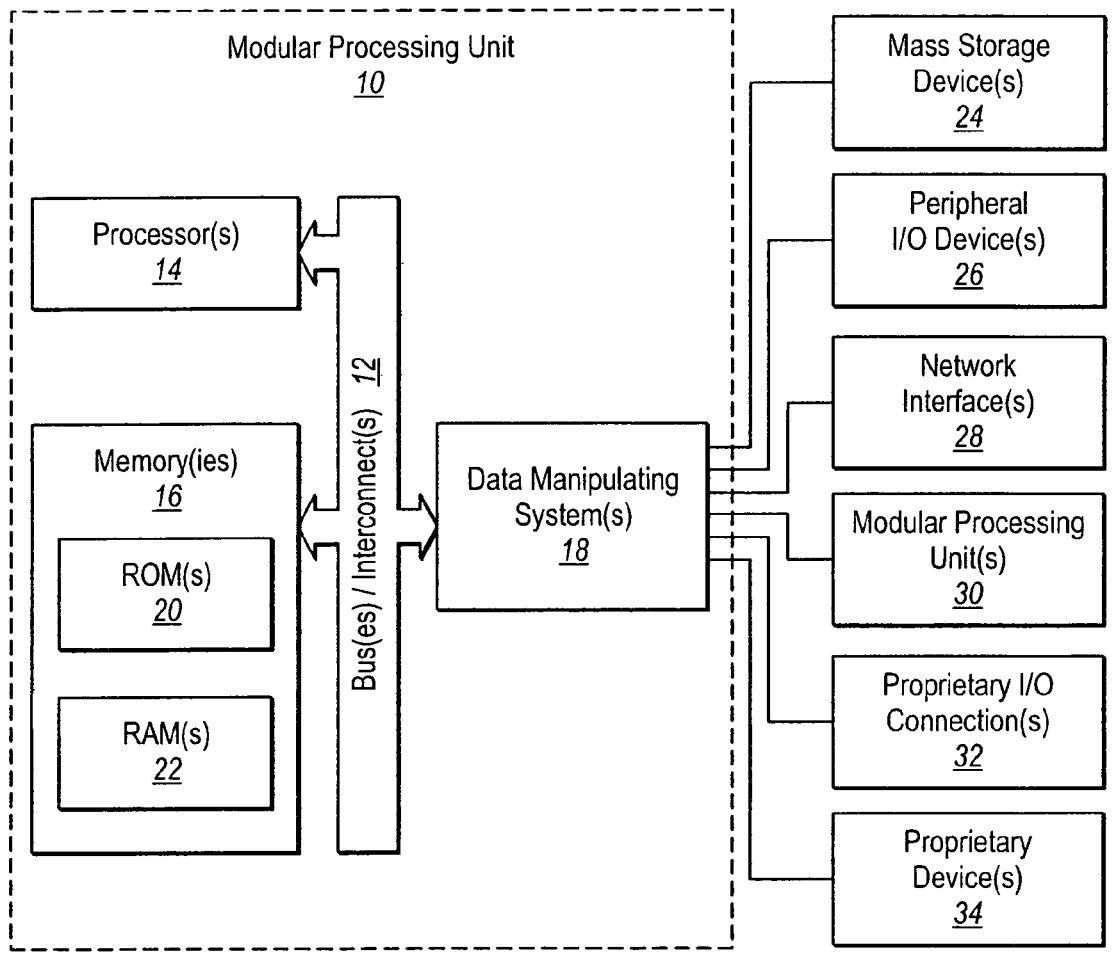
FIG. 1 illustrates a block diagram that provides a representative modular processing unit connected to peripherals to provide a representative computing enterprise in accordance with the present invention.

FIG. 1 and the corresponding discussion are intended to provide a general description of a suitable operating environment in accordance with embodiments of the present invention. As will be further discussed below, embodiments of the present invention embrace the use of one or more dynamically modular processing units in a variety of customizable enterprise configurations, including in a networked or combination configuration, as will be discussed below.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by one or more processors, such as one associated with a general-purpose modular processing unit capable of performing various different functions or one associated with a special-purpose modular processing unit capable of performing a limited number of functions.

Computer executable instructions cause the one or more processors of the enterprise to perform a particular function or group of functions and are examples of program code means for implementing steps for methods of processing. Furthermore, a particular sequence of the executable instructions provides an example of corresponding acts that may be used to implement such steps.

Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), any solid state storage device (e.g., flash memory, smart media, etc.), or any other device or component that is capable of providing data or executable instructions that may be accessed by a processing unit.

With reference to FIG. 1, a representative enterprise includes modular processing unit 10, which may be used as a general-purpose or special-purpose processing unit. For example, modular processing unit 10 may be employed alone or with one or more similar modular processing units as a personal computer, a notebook computer, a personal digital assistant ("PDA") or other hand-held device, a workstation, a minicomputer, a mainframe, a supercomputer, a multi-processor system, a network computer, a processor-based consumer device, a smart appliance or device, a control system, or the like. Using multiple processing units in the same enterprise provides increased processing capabilities. For example, each processing unit of an enterprise can be dedicated to a particular task or can jointly participate in distributed processing.

In FIG. 1, modular processing unit 10 includes one or more buses and/or interconnect(s) 12, which may be configured to connect various components thereof and enables data to be exchanged between two or more components. Bus(es)/interconnect(s) 12 may include one of a variety of bus structures including a memory bus, a peripheral bus, or a local bus that uses any of a variety of bus architectures. Typical components connected by bus(es)/interconnect(s) 12 include one or more processors 14 and one or more memories 16. Other components may be selectively connected to bus(es)/interconnect(s) 12 through the use of logic, one or more systems, one or more subsystems and/or one or more I/O interfaces, hereafter referred to as "data manipulating system(s) 18." Moreover, other components may be externally connected to bus(es)/interconnect(s) 12 through the use of logic, one or more systems, one or more subsystems and/or one or more I/O interfaces, and/or may function as logic, one or more systems, one or more subsystems and/or one or more I/O interfaces, such as modular processing unit(s) 30 and/or proprietary device(s) 34. Examples of I/O interfaces include one or more mass storage device interfaces, one or more input interfaces, one or more output interfaces, and the like. Accordingly, embodiments of the present invention embrace the ability to use one or more I/O interfaces and/or the ability to change the usability of a product based on the logic or other data manipulating system employed.

The logic may be tied to an interface, part of a system, subsystem and/or used to perform a specific task. Accordingly, the logic or other data manipulating system may allow, for example, for IEEE1394 (firewire), wherein the logic or other data manipulating system is an I/O interface. Alternatively or additionally, logic or another data manipulating system may be used that allows a modular processing unit to be tied into another external system or subsystem. For example, an external system or subsystem that may or may not include a special I/O connection. Alternatively or additionally, logic or other data manipulating system may be used wherein no external I/O is associated with the logic. Embodiments of the present invention also embrace the use of specialty logic, such as for ECUs for vehicles, hydraulic control systems, etc. and/or logic that informs a processor how to control a specific piece of hardware. Moreover, those skilled in the art will appreciate that embodiments of the present invention embrace a plethora of different systems and/or configurations that utilize logic, systems, subsystems and/or I/O interfaces.

As provided above, embodiments of the present invention embrace the ability to use one or more I/O interfaces and/or the ability to change the usability of a product based on the logic or other data manipulating system employed. For example, where a modular processing unit is part of a personal computing system that includes one or more I/O interfaces and logic designed for use as a desktop computer, the logic or other data manipulating system may be changed to include flash memory or logic to perform audio encoding for a music station that wants to take analog audio via two standard RCAs and broadcast them to an IP address. Accordingly, the modular processing unit may be part of a system that is used as an appliance rather than a computer system due to a modification made to the data manipulating system(s) (e.g., logic, system, subsystem, I/O interface(s), etc.) on the back plane of the modular processing unit. Thus, a modification of the data manipulating system(s) on the back plane can change the application of the modular processing unit. Accordingly, embodiments of the present invention embrace very adaptable modular processing units.

As provided above, processing unit 10 includes one or more processors 14, such as a central processor and optionally one or more other processors designed to perform a particular function or task. It is typically processor 14 that executes the instructions provided on computer readable media, such as on memory(ies) 16, a magnetic hard disk, a removable magnetic disk, a magnetic cassette, an optical disk, or from a communication connection, which may also be viewed as a computer readable medium.

Memory(ies) 16 includes one or more computer readable media that may be configured to include or includes thereon data or instructions for manipulating data, and may be accessed by processor(s) 14 through bus(es)/interconnect(s) 12. Memory(ies) 16 may include, for example, ROM(s) 20, used to permanently store information, and/or RAM(s) 22, used to temporarily store information. ROM(s) 20 may include a basic input/output system ("BIOS") having one or more routines that are used to establish communication, such as during start-up of modular processing unit 10. During operation, RAM(s) 22 may include one or more program modules, such as one or more operating systems, application programs, and/or program data.

As illustrated, at least some embodiments of the present invention embrace a non-peripheral encasement, which provides a more robust processing unit that enables use of the unit in a variety of different applications. In FIG. 1, one or more mass storage device interfaces (illustrated as data manipulating system(s) 18) may be used to connect one or more mass storage devices 24 to bus(es)/interconnect(s) 12. The mass storage devices 24 are peripheral to modular processing unit 10 and allow modular processing unit 10 to retain large amounts of data. Examples of mass storage devices include hard disk drives, magnetic disk drives, tape drives and optical disk drives.

A mass storage device 24 may read from and/or write to a magnetic hard disk, a removable magnetic disk, a magnetic cassette, an optical disk, or another computer readable medium. Mass storage devices 24 and their corresponding computer readable media provide nonvolatile storage of data and/or executable instructions that may include one or more program modules, such as an operating system, one or more application programs, other program modules, or program data. Such executable instructions are examples of program code means for implementing steps for methods disclosed herein.

Data manipulating system(s) 18 may be employed to enable data and/or instructions to be exchanged with modular processing unit 10 through one or more corresponding peripheral I/O devices 26. Examples of peripheral I/O devices 26 include input devices such as a keyboard and/or alternate input devices, such as a mouse, trackball, light pen, stylus, or other pointing device, a microphone, a joystick, a game pad, a satellite dish, a scanner, a camcorder, a digital camera, a sensor, and the like, and/or output devices such as a monitor or display screen, a speaker, a printer, a control system, and the like. Similarly, examples of data manipulating system(s) 18 coupled with specialized logic that may be used to connect the peripheral I/O devices 26 to bus(es)/interconnect(s) 12 include a serial port, a parallel port, a game port, a universal serial bus ("USB"), a firewire (IEEE 1394), a wireless receiver, a video adapter, an audio adapter, a parallel port, a wireless transmitter, any parallel or serialized I/O peripherals or another interface.

Data manipulating system(s) 18 enable an exchange of information across one or more network interfaces 28. Examples of network interfaces 28 include a connection that enables information to be exchanged between processing units, a network adapter for connection to a local area network ("LAN") or a modem, a wireless link, or another adapter for connection to a wide area network ("WAN"), such as the Internet. Network interface 28 may be incorporated with or peripheral to modular processing unit 10, and may be associated with a LAN, a wireless network, a WAN and/or any connection between processing units.

Data manipulating system(s) 18 enable modular processing unit 10 to exchange information with one or more other local or remote modular processing units 30 or computer devices. A connection between modular processing unit 10 and modular processing unit 30 may include hardwired and/or wireless links. Accordingly, embodiments of the present invention embrace direct bus-to-bus connections. This enables the creation of a large bus system. It also eliminates hacking as currently known due to direct bus-to-bus connections of an enterprise. Furthermore, data manipulating system(s) 18 enable modular processing unit 10 to exchange information with one or more proprietary I/O connections 32 and/or one or more proprietary devices 34.

Program modules or portions thereof that are accessible to the processing unit may be stored in a remote memory storage device. Furthermore, in a networked system or combined configuration, modular processing unit 10 may participate in a distributed computing environment where functions or tasks are performed by a plurality of processing units. Alternatively, each processing unit of a combined configuration/enterprise may be dedicated to a particular task. Thus, for example, one processing unit of an enterprise may be dedicated to video data, thereby replacing a traditional video card, and provides increased processing capabilities for performing such tasks over traditional techniques.

Figure 2:
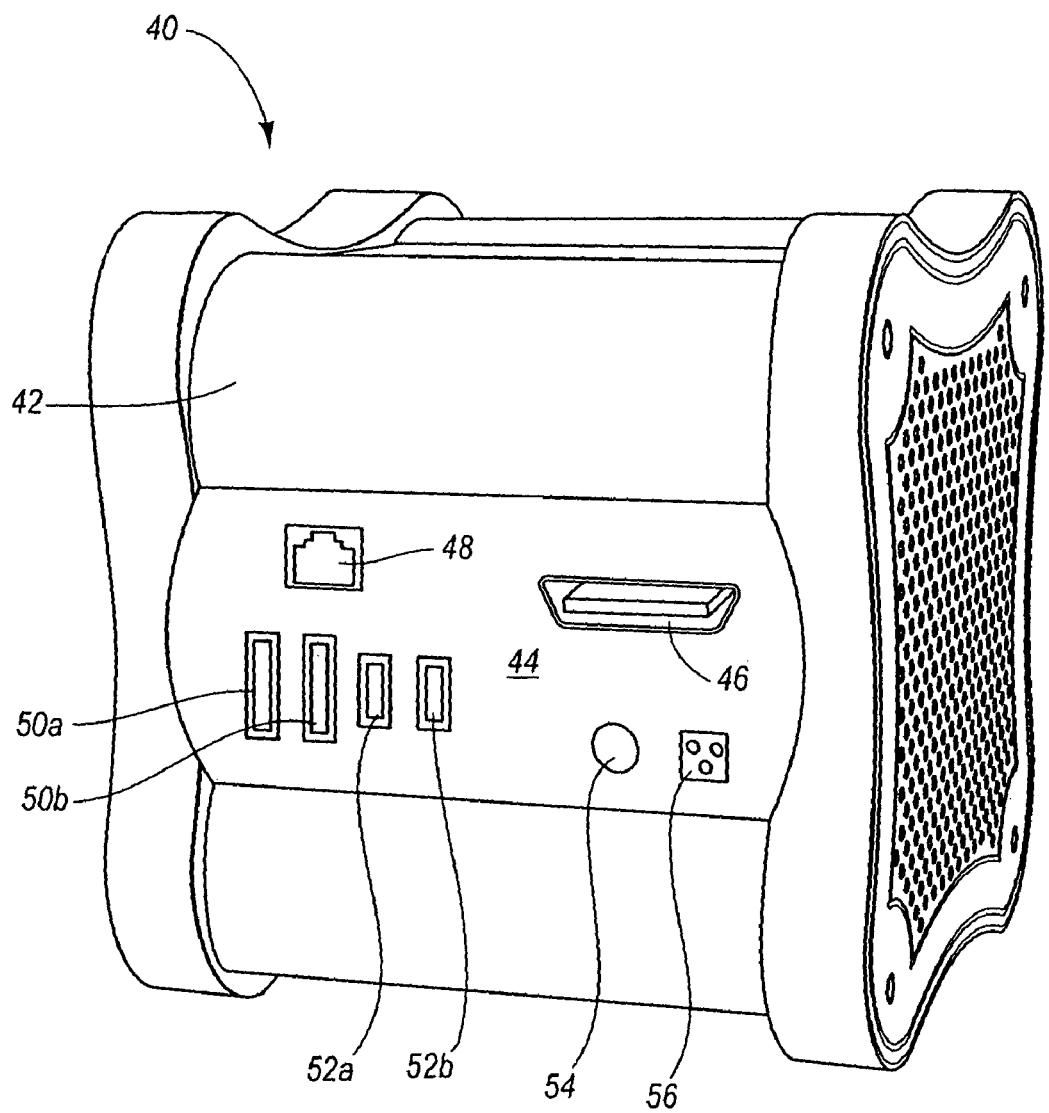
FIG. 2 illustrates a representative embodiment of a durable and dynamically modular processing unit.

While those skilled in the art will appreciate that embodiments of the present invention may comprise a variety of configurations, reference is made to FIG. 2, which illustrates a representative embodiment of a durable and dynamically modular processing unit. In the illustrated embodiment of FIG. 2, processing unit 40 is durable and dynamically modular. In the illustrated embodiment, unit 40 is a 3½-inch (8.9 cm) cube platform that utilizes an advanced thermodynamic cooling model, eliminating any need for a cooling fan.

However, as provided herein, embodiments of the present invention embrace the use of other cooling processes in addition to or in place of a thermodynamic cooling process, such as a forced air cooling process and/or a liquid cooling process. Moreover, while the illustrated embodiment includes a 3½-inch cube platform, those skilled in the art will appreciate that embodiments of the present invention embrace the use of a modular processing unit that is greater than or less than a 3½-inch cube platform. Similarly, other embodiments embrace the use of shapes other than a cube.

Processing unit 40 also includes a layered motherboard configuration, that optimizes processing and memory ratios, and a bus architecture that enhances performance and increases both hardware and software stability, each of which will be further discussed below. Those skilled in the art will appreciate that other embodiments of the present invention also embrace non-layered motherboards. Moreover, other embodiments of the present invention embrace embedded motherboard configurations, wherein components of the motherboard are embedded into one or more materials that provide an insulation between components and embed the components into the one or more materials, and wherein one or more of the motherboard components are mechanical, optical, electrical or electro-mechanical. Furthermore, at least some of the embodiments of embedded motherboard configurations include mechanical, optical, electrical and/or electro-mechanical components that are fixed into a three-dimensional, sterile environment. Examples of such materials include polymers, rubbers, epoxies, and/or any non-conducting embedding compound(s).

Embodiments of the present invention embrace providing processing versatility. For example, in accordance with at least some embodiments of the present invention, processing burdens are identified and then solved by selectively dedicating and/or allocating processing power. For example, a particular system is defined according to specific needs, such that dedication or allocation of processing power is controlled. Thus, one or more modular processing units may be dedicated to provide processing power to such specific needs (e.g., video, audio, one or more systems, one or more subsystems, etc.). In some embodiments, being able to provide processing power decreases the load on a central unit. Accordingly, processing power is driven to the areas needed.

While the illustrated embodiment, processing unit 40 includes a 2 HGz processor and 1.5 GB of RAM, those skilled in the art will appreciate that other embodiments of the present invention embrace the use of a faster or slower processor and/or more or less RAM. In at least some embodiments of the present invention, the speed of the processor and the amount of RAM of a processing unit depends on the nature for which the processing unit is to be used.

A highly dynamic, customizable, and interchangeable back plane 44 provides support to peripherals and vertical applications. In the illustrated embodiment, back plane 44 is selectively coupled to encasement 42 and may include one or more features, interfaces, capabilities, logic and/or components that allow unit 40 to be dynamically customizable. In the illustrated embodiment, back plane 44 includes DVI Video port 46, Ethernet port 48, USB ports 50 (50*a* and 50*b*), SATA bus ports 52 (52*a* and 52*b*), power button 54, and power port 56. Back plane 44 may also include a mechanism that electrically couples two or more modular processing units together to increase the processing capabilities of the entire system as indicated above, and to provide scaled processing as will be further disclosed below.

Those skilled in the art will appreciate that back plane 44 with its corresponding features, interfaces, capabilities, logic and/or components are representative only and that embodiments of the present invention embrace back planes having a variety of different features, interfaces, capabilities and/or components. Accordingly, a processing unit is dynamically customizable by allowing one back plane to be replaced by another back plane in order to allow a user to selectively modify the logic, features and/or capabilities of the processing unit.

Moreover, embodiments of the present invention embrace any number and/or type of logic and/or connectors to allow use of one or more modular processing units 40 in a variety of different environments. For example, the environments include vehicles (e.g., cars, trucks, motorcycles, etc.), hydraulic control systems, and other environments. The changing of data manipulating system(s) on the back plane allows for scaling vertically and/or horizontally for a variety of environments, as will be further discussed below.

Furthermore, embodiments of the present invention embrace a variety of shapes and sizes of modular processing units. For example, in FIG. 2 modular processing unit 40 is a cube that is smaller than traditional processing units for a variety of reasons.

As will be appreciated by those skilled in the art, embodiments of the present invention are easier to support than traditional techniques because of, for example, materials used, the size and/or shape, the type of logic and/or an elimination of a peripherals-based encasement.

In the illustrated embodiment, power button 54 includes three states, namely on, off and standby for power boot. When the power is turned on and received, unit 40 is instructed to load and boot an operating system supported in memory. When the power is turned off, processing control unit 40 will interrupt any ongoing processing and begin a shut down sequence that is followed by a standby state, wherein the system waits for the power on state to be activated.

USB ports 50 are configured to connect peripheral input/output devices to processing unit 40. Examples of such input or output devices include a keyboard, a mouse or trackball, a monitor, printer, another processing unit or computer device, a modem, and a camera.

SATA bus ports 52 are configured to electronically couple and support mass storage devices that are peripheral to processing unit 40. Examples of such mass storage devices include floppy disk drives, CD-ROM drives, hard drives, tape drives, and the like.

As provided above, other embodiments of the present invention embrace the use of additional ports and means for connecting peripheral devices, as will be appreciated by one of ordinary skill in the art. Therefore, the particular ports and means for connecting specifically identified and described herein are intended to be illustrative only and not limiting in any way.

As provided herein, a variety of advantages exist through the use of a non-peripheral processing unit over larger, peripheral packed computer units. By way of example, the user is able to selectively reduce the space required to accommodate the enterprise, and may still provide increased processing power by adding processing units to the system while still requiring less overall space. Moreover, since each of the processing units includes solid-state components rather than systems that are prone to breaking down, the individual units may be hidden (e.g., in a wall, in furniture, in a closet, in a decorative device such as a clock).

The durability of the individual processing units/cubes allows processing to take place in locations that were otherwise unthinkable with traditional techniques. For example, the processing units can be buried in the earth, located in water, buried in the sea, placed on the heads of drill bits that drive hundreds of feet into the earth, on unstable surfaces in furniture, etc. The potential processing locations are endless. Other advantages include a reduction in noise and heat, an ability to provide customizable "smart" technology into various devices available to consumers, such as furniture, fixtures, vehicles, structures, supports, appliances, equipment, personal items, etc.

Figure 3:
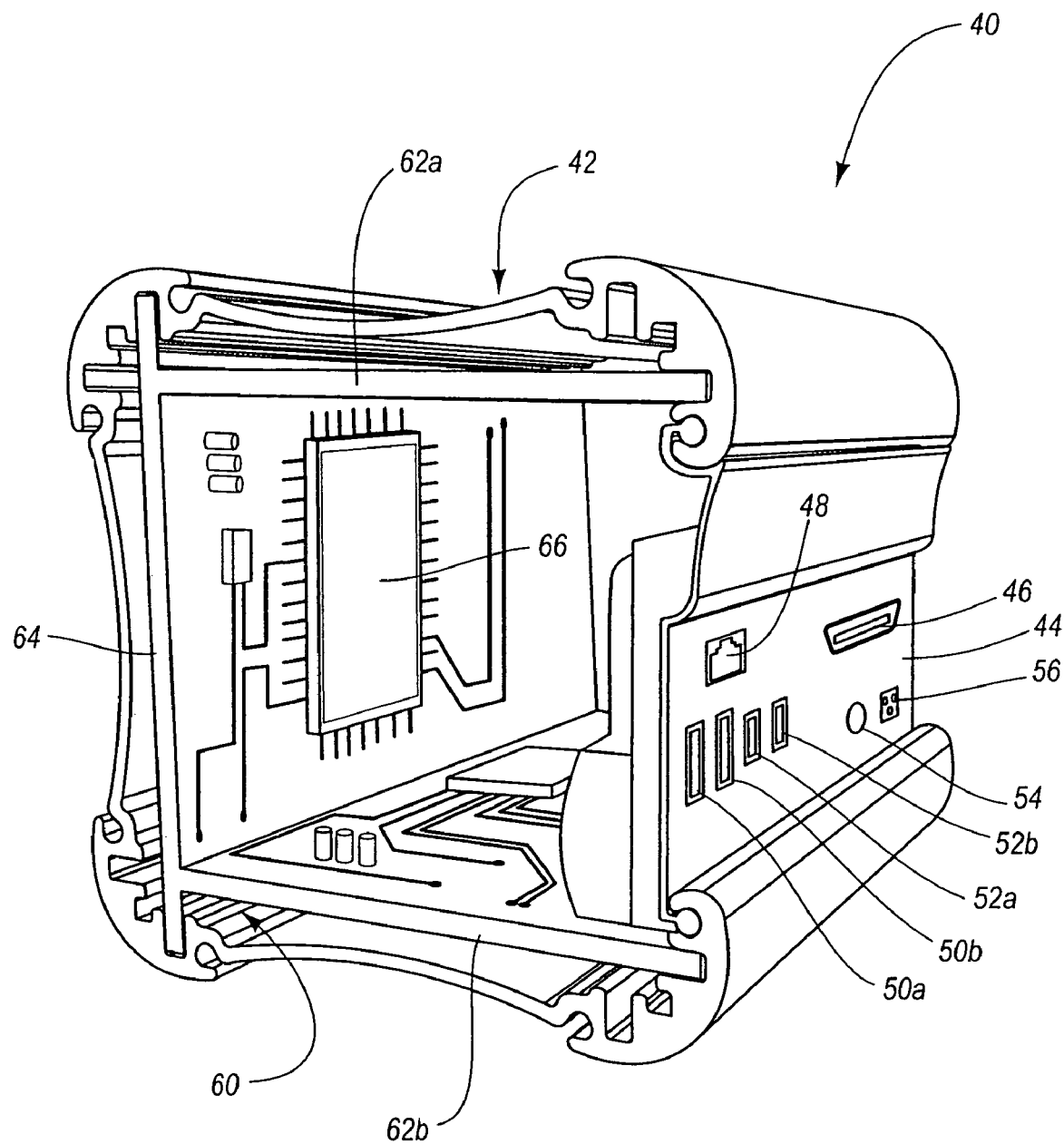
FIG. 3 provides another view of the embodiment of FIG. 2 having a non-peripheral based encasement, a cooling process (e.g., thermodynamic convection cooling, forced air, and/or liquid cooling), an optimized layered printed circuit board configuration, optimized processing and memory ratios, and a dynamic back plane that provides increased flexibility and support to peripherals and applications.

With reference now to FIG. 3, another view of the embodiment of FIG. 2 is provided, wherein the view illustrates processing unit 40 with the side walls of the cube removed to more fully illustrate the non-peripheral based encasement, cooling process (e.g., thermodynamic convection cooling, forced air, and/or liquid cooling), optimized layered circuit board configuration, and dynamic back plane. In the illustrated embodiment, the various boards are coupled together by using a force fit technique, which prevents accidental decoupling of the boards and enables interchangeability. The boards provide for an enhanced EMI distribution and/or chip/logic placement. Those skilled in the art will appreciate that embodiments of the present invention embrace any number of boards and/or configurations. Furthermore, board structures may be modified for a particular benefit and/or need based on one or more applications and/or features. In FIG. 3, processing unit 40 includes a layered circuit board/motherboard configuration 60 that includes two parallel sideboards 62 (62*a* and 62*b*) and a central board 64 transverse to and electronically coupling sideboards 62. While the illustrated embodiment provides a tri-board configuration, those skilled in the art will appreciate that embodiments of the present invention embrace board configurations having less than three boards, and layered board configurations having more than three boards. Moreover, embodiments of the present invention embrace other configurations of circuit boards, other than boards being at right angles to each other.

In the illustrated embodiment, the layered motherboard 60 is supported within encasement 42 using means for coupling motherboard 60 to encasement 42. In the illustrated embodiment, the means for coupling motherboard 60 to encasement 42 include a variety of channeled slots that are configured to selectively receive at least a portion of motherboard 60 and to hold motherboard 60 in position. As upgrades are necessary with the advancing technology, such as when processor 66 is to be replaced with an improved processor, the corresponding board (e.g., central board 64) is removed from the encasement 42 and a new board with a new processor is inserted to enable the upgrade. Accordingly, embodiments of the present invention have proven to facilitate upgrades as necessary and to provide a customizable and dynamic processing unit.

Processing unit 40 also includes one or more processors that at are configured to perform one or more tasks. In FIG. 3, the one or more processors are illustrated as processor 66, which is coupled to central board 64. As technology advances, there may be a time when the user of processing unit 40 will want to replace processor 66 with an upgraded processor. Accordingly, central board 64 may be removed from encasement 42 and a new central board having an upgraded processor may be installed and used in association with unit 40. Accordingly, embodiments of the present invention embrace dynamically customizable processing units that are easily upgraded and thus provide a platform having longevity in contrast to traditional techniques.

Figure 4:
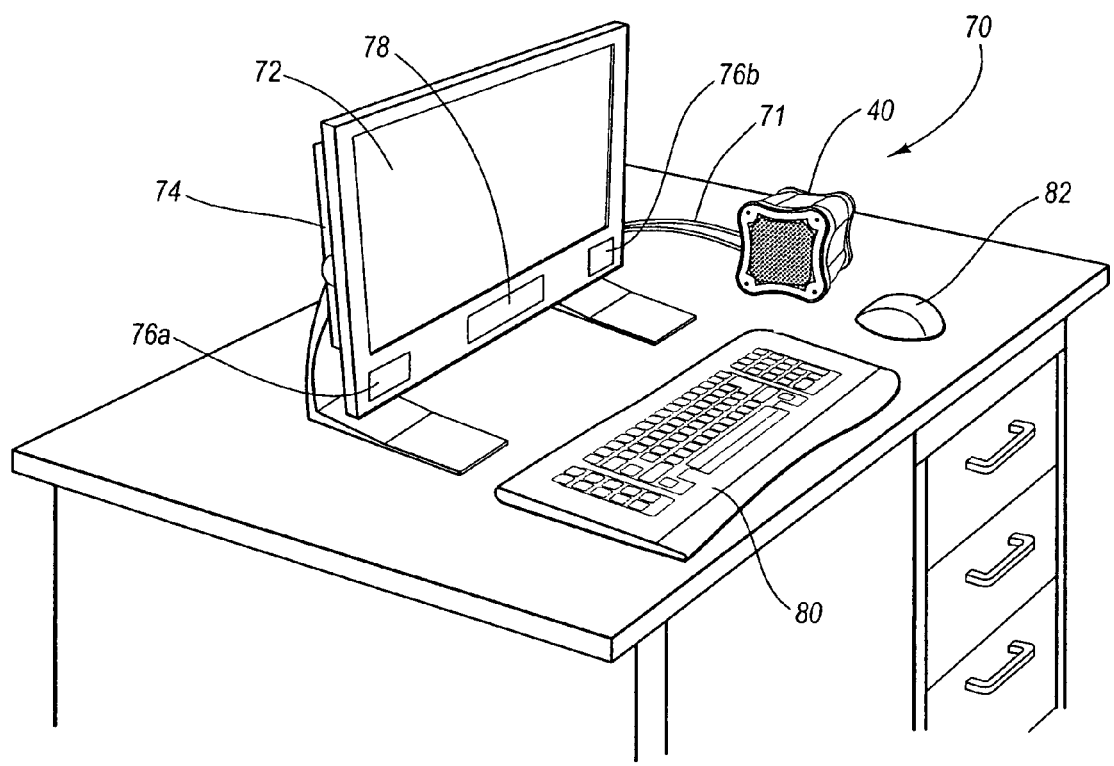
FIG. 4 provides a representative enterprise wherein a dynamically modular processing unit, having a non-peripheral based encasement, is employed alone in a personal computing enterprise.

With reference now to FIG. 4, a representative enterprise 70 is illustrated, wherein a dynamically modular processing unit 40 having a non-peripheral based encasement, is employed alone in a personal computing enterprise. In the illustrated embodiment, processing unit 40 includes power connection 71 and employs wireless technology with the peripheral devices of enterprise 70. The peripheral devices include monitor 72 having hard disk drive 74, speakers 76, and CD ROM drive 78, keyboard 80 and mouse 82. Those skilled in the art will appreciate that embodiments of the present invention also embrace personal computing enterprises that employ technologies other than wireless technologies.

Processing unit 40 is the driving force of enterprise 70 since it provides the processing power to manipulate data in order to perform tasks. The dynamic and customizable nature of the present invention allows a user to easily augment processing power. In the present embodiment, processing unit 40 is a 3½-inch (8.9 cm) cube that utilizes thermodynamic cooling and optimizes processing and memory ratios. However, as provided herein, embodiments of the present invention embrace the use of other cooling processes in addition to or in place of a thermodynamic cooling process, such as a forced air cooling process and/or a liquid cooling process. Furthermore, while the illustrated embodiment includes a 3½-inch cube platform, those skilled in the art will appreciate that embodiments of the present invention embrace the use of a modular processing unit that is greater than or less than a 3½-inch cube platform. Similarly, other embodiments embrace the use of shapes other than a cube.

In particular, processing unit 40 of the illustrated embodiment includes a 2 GHz processor, 1.5 G RAM, a 512 L2 cache, and wireless networking interfaces. So, for example, should the user of enterprise 70 determine that increased processing power is desired for enterprise 70, rather than having to purchase a new system as is required by some traditional technologies, the user may simply add one or more modular processing units to enterprise 70. The processing units/cubes may be selectively allocated by the user as desired for performing processing. For example, the processing units may be employed to perform distributive processing, each unit may be allocated for performing a particular task (e.g., one unit may be dedicated for processing video data, or another task), or the modular units may function together as one processing unit.

While the present example includes a processing unit that includes a 2 GHz processor, 1.5 G RAM, and a 512 L2 cache, those skilled in the art will appreciate that other embodiments of the present invention embrace the use of a faster or slower processor, more or less RAM, and/or a different cache. In at least some embodiments of the present invention, the capabilities of the processing unit depends on the nature for which the processing unit will be used.

While FIG. 4 illustrates processing unit 40 on top of the illustrated desk, the robust nature of the processing unit/cube allows for unit 40 to alternatively be placed in a non-conspicuous place, such as in a wall, mounted underneath the desk, in an ornamental device or object, etc. Accordingly, the illustrated embodiment eliminates traditional towers that tend to be kicked and that tend to produce sound from the cooling system inside of the tower. No sound is emitted from unit 40 as all internal components are solid states when convection cooling or liquid cooling is employed.

Figure 5:
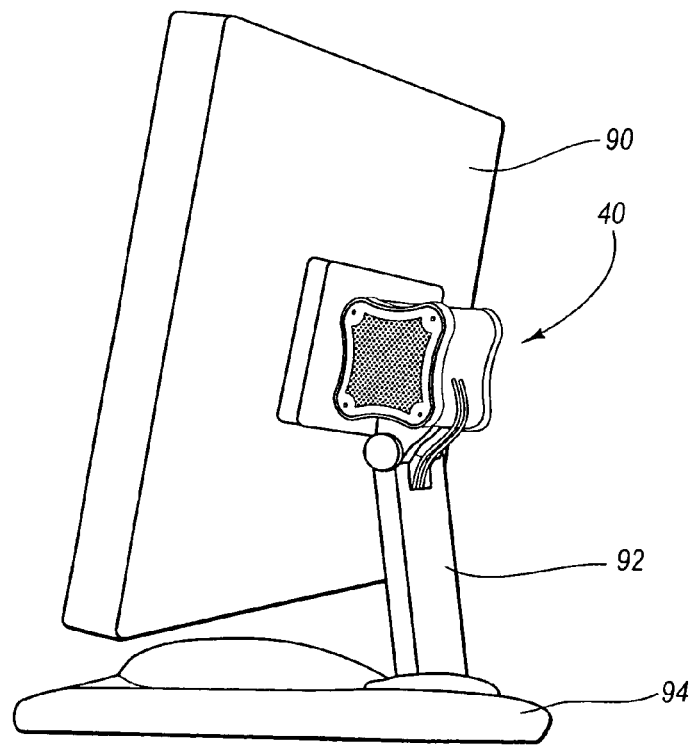
FIG. 5 provides a representative enterprise wherein a dynamically modular processing unit, having a non-peripheral based encasement, is employed in another representative computing enterprise.

With reference now to FIG. 5, another example is provided for utilizing a modular processing unit in a computing enterprise. In FIG. 5, an ability of modular processing unit 40 to function as a load-bearing member is illustrated. For example, a modular processing unit may be used to bridge two or more structures together and to contribute to the overall structural support and stability of the structure or enterprise. In addition, a modular processing unit may bear a load attached directly to a primary support body. For example, a computer screen or monitor may be physically supported and the processing controlled by a modular processing unit. In the illustrated embodiment, monitor 90 is mounted to modular processing unit 40, which is in turn mounted to a stand 92 having a base 94.

Figure 6:
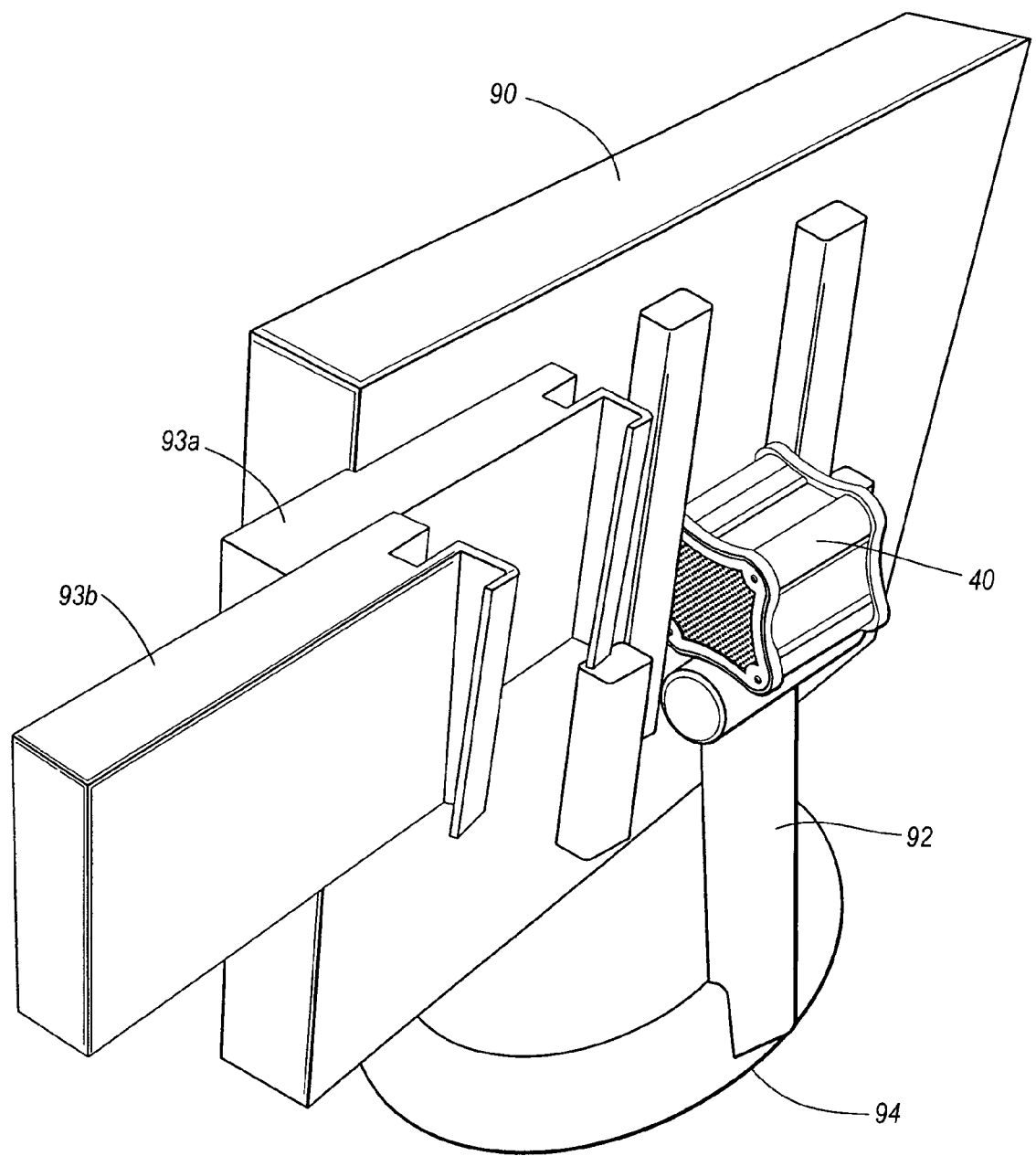
FIG. 6 provides another representative enterprise similar to FIG. 5 that includes additional peripherals, such as removable drives or other modular peripherals.

With reference now to FIG. 6, another representative enterprise is illustrated, wherein a dynamically modular processing unit 40 having a non-peripheral based encasement, is employed computing enterprise. In FIG. 6, the representative enterprise is similar to the embodiment illustrated in FIG. 5, however one or more modular peripherals are selectively coupled to the enterprise. In particular, FIG. 6 illustrates mass storage devices 93 that are selectively coupled to the enterprise as peripherals. Those skilled in the art will appreciate that any number (e.g., less than two or more than two) and/or type of peripherals may be employed. Examples of such peripherals include mass storage devices, I/O devices, network interfaces, other modular processing units, proprietary I/O connections; proprietary devices, and the like.

Figure 7:
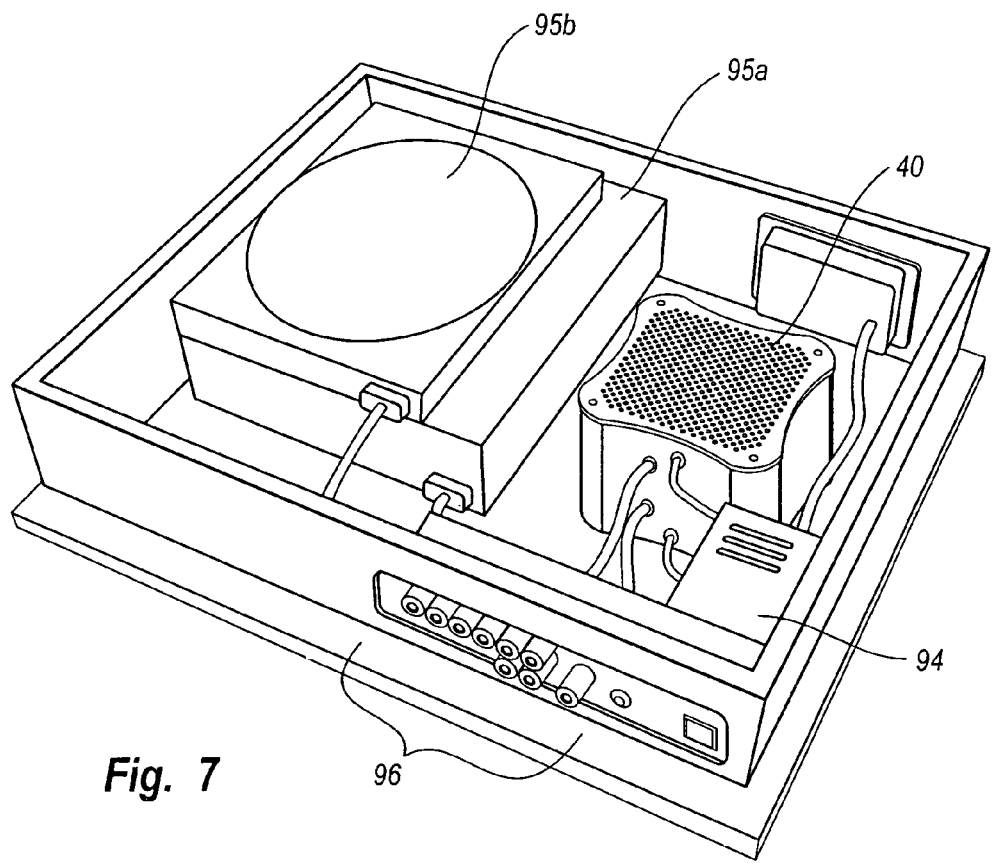
FIG. 7 provides another representative enterprise wherein a dynamically modular processing unit is utilized in an electronic enterprise.

With reference now to FIG. 7, another representative embodiment is illustrated, wherein a dynamically modular processing unit 40 having a non-peripheral based encasement, is employed in an enterprise. In accordance with at least some embodiments of the present invention, a modular processing unit having a non-peripheral based encasement may be employed in a central processing unit or in other electronic devices, including a television, a stereo system, a recording unit, a set top box, or any other electronic device. Accordingly, the modular processing unit may be selectively used to in the enterprise to monitor, warn, inform, control, supervise, record, recognize, etc. In FIG. 7, modular processing unit is coupled to a power source 94, one or more other peripherals 95, and connections 96 for use in the enterprise.

Figure 8:
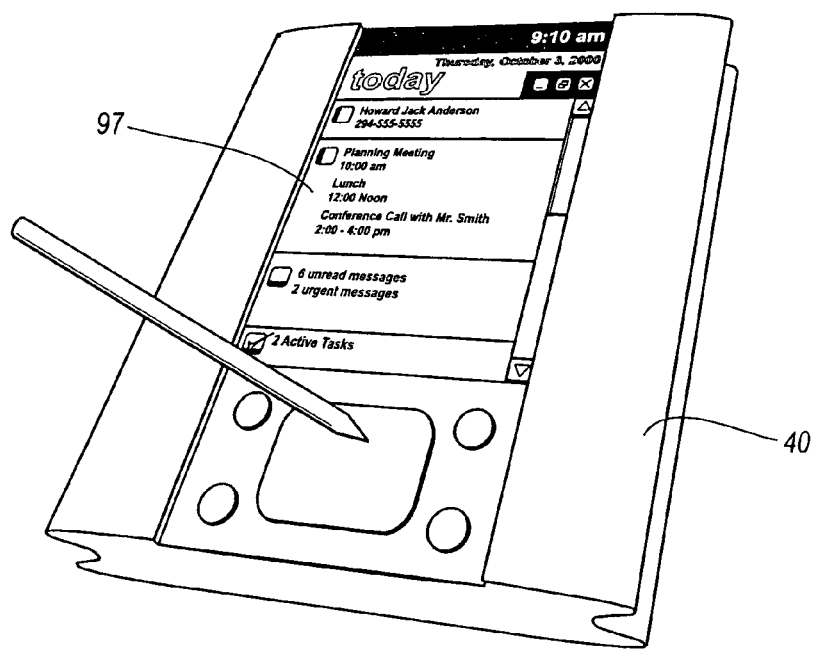
FIG. 8 provides another representative enterprise, wherein a dynamically modular processing unit is utilized as a handheld enterprise.

As provided herein, embodiments of the present invention embrace a variety of shapes and sizes for a modular processing unit. With reference now to FIG. 8, a modular processing unit 40 is illustrated that is employed as a hand-held computing enterprise, such as a personal digital assistant ("PDA"). An I/O peripheral 97 is coupled to the modular processing unit 40. In the illustrated embodiment, the I/O peripheral 97 includes a monitor and a stylus to enable input and output. Those skilled in the art will appreciate that additional peripherals may be included, such as speakers, a microphone, a cellular telephone, keyboard, or any other type of peripheral, representative examples of such will be provided below.

In the embodiment of FIG. 8, the hand-held computing enterprise has the dimensions of 3.5"×4.75"×0.75", however those skilled in the art will appreciate that the present invention also embraces embodiments that are larger or smaller than the illustrated embodiment. In FIG. 8, the I/O peripheral 97 is a slide on pieces that is selectively coupled to modular processing unit 40, which includes a non-layered board design to allow unit 40 to be more slender. Additional peripherals include a power source and mass storage device. In one embodiment, the mass storage device is a 40 G hard drive that enables the user to always have all of his/her files. Accordingly, the embodiment of FIG. 8 enables a user to employ a complete computer in the palm of his/her hand. Moreover, because of the solid state components, the embodiment of FIG. 8 is more durable than traditional techniques. Furthermore, in at least some embodiments, the casing includes metal to increase the durability. Accordingly, if unit 40 is dropped, the core will not be broken.

Figure 9:
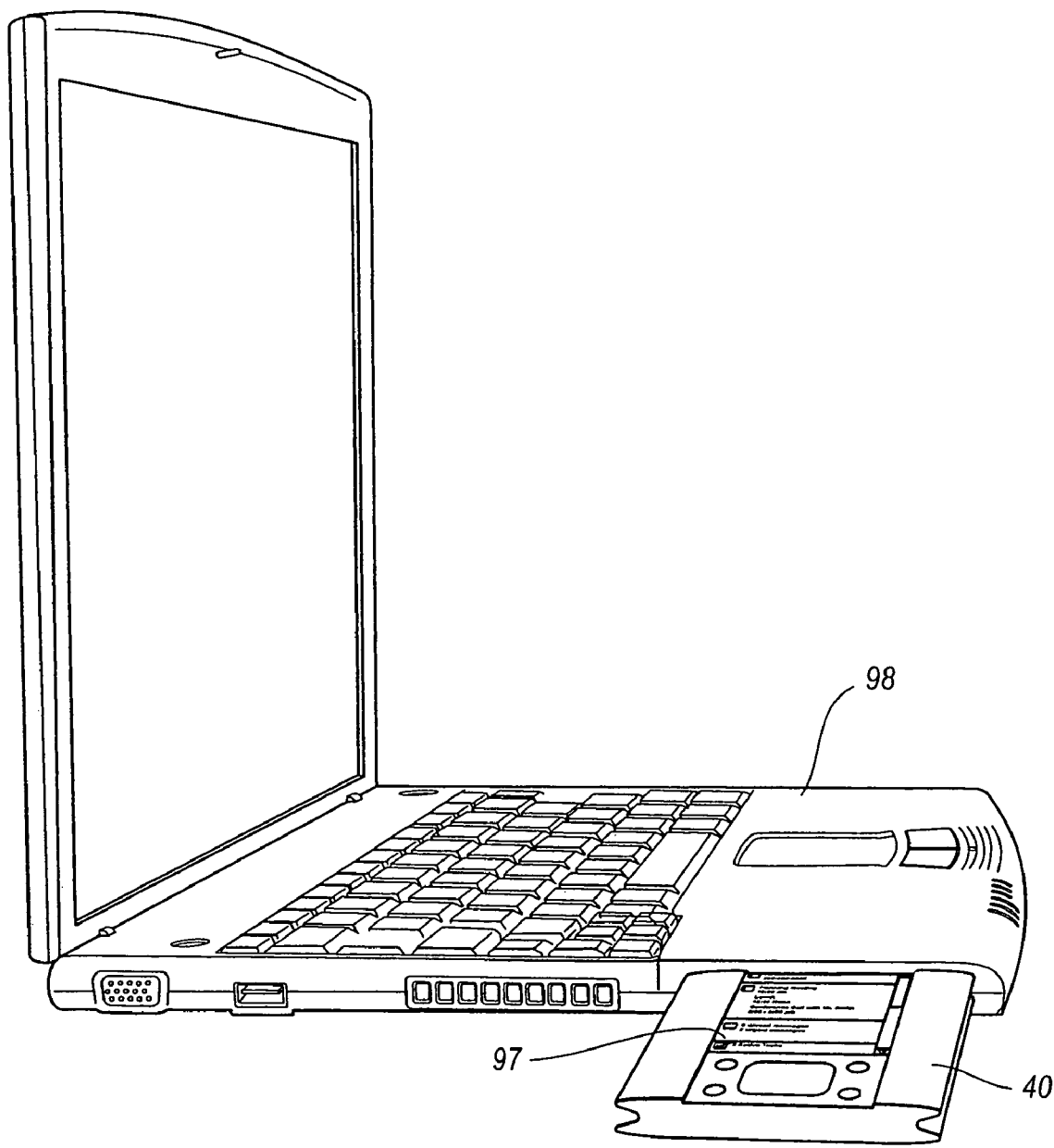
FIG. 9 provides a utilization of the embodiment of FIG. 8 in another representative enterprise.

With reference now to FIG. 9, another representative enterprise is illustrated that includes a dynamically modular processing unit 40 having a non-peripheral based encasement. In FIG. 9, processing unit 40, having an I/O peripheral 97, is selectively coupled to peripheral 98 to allow the representative enterprise to function as a high-end laptop computer. Utilizing a liquid cooling technique, for example, processing unit 40 can be a very powerful handheld machine. And, as illustrated in FIG. 9, unit 40 may be selectively inserted like a cartridge into a large I/O peripheral 98, which includes a keyboard, monitor, speakers, and optionally logic depending on end user application. Once unit 40 is decoupled/ejected from peripheral 98, unit 40 can retain the files to allow the user to always have his/her files therewith. Accordingly, there is no need to synchronize unit 40 with peripheral 98 since unit 40 includes all of the files. While the embodiment illustrated in FIG. 9 includes one modular processing unit, other embodiments of the present invention embrace the utilization of multiple processing units.

Similarly, modular processing unit 40 may be inserted or otherwise coupled to a variety of other types of peripherals, including an enterprise in a vehicle, at home, at the office, or the like. Unit 40 may be used to preserve and provide music, movies, pictures or any other audio and/or video.

Figure 10:
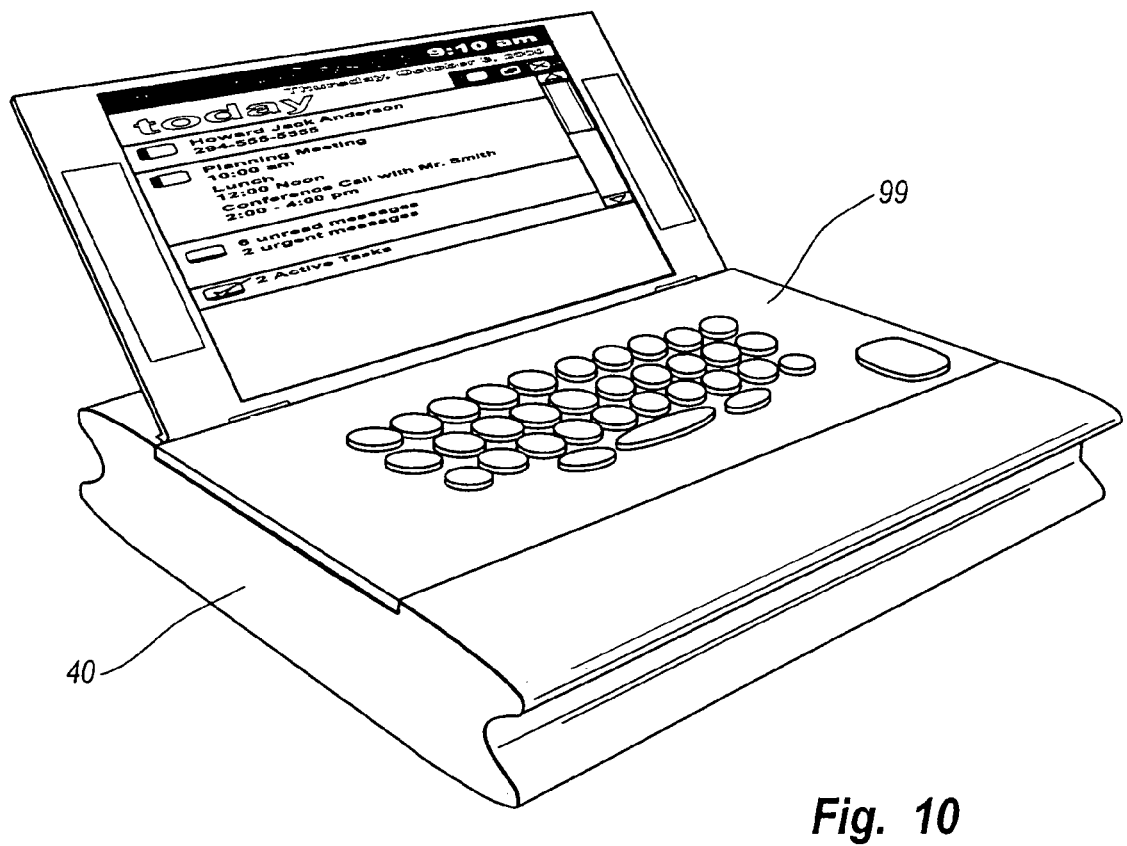
FIG. 10 provides another representative handheld enterprise having a non-peripheral based encasement combined with an external flip-up I/O peripheral.
Figure 11:
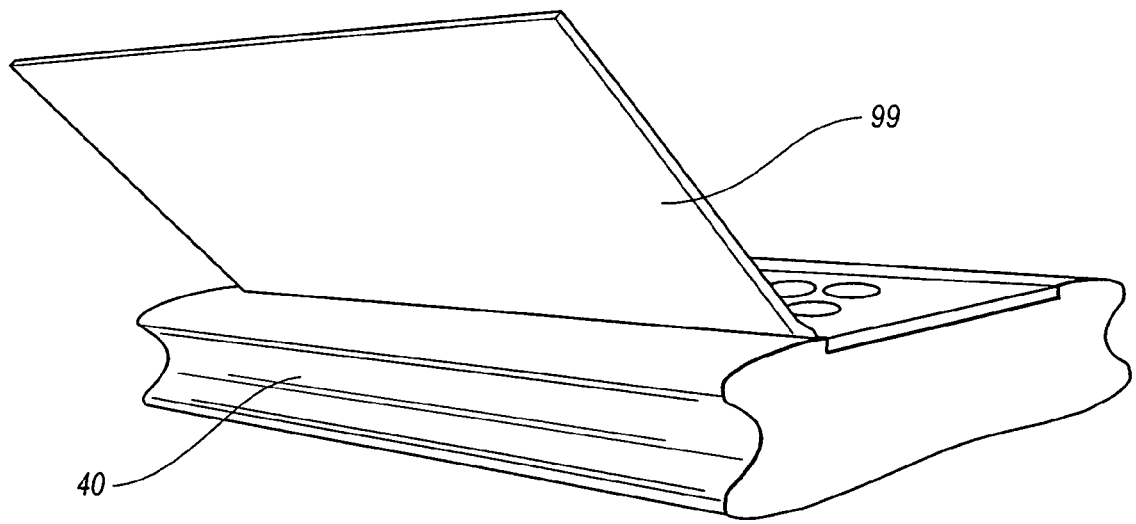
FIG. 11 provides another view of the embodiment of FIG. 10.

With reference now to FIGS. 10-11, another representative enterprise is illustrated, wherein a dynamically modular processing unit 40 having a non-peripheral based encasement, is employed in a personal computing enterprise. In FIGS. 10-11, modular processing unit 40 is coupled to a flip top peripheral 99, which includes a monitor, thumb keyboard and mouse device. The flip top peripheral 99 runs at full speeds with a hand top computer to do spreadsheets, surf the internet, and other functions and/or tasks. The embodiment illustrated in FIGS. 10-11 boots a full version of an operating system when the flip top is open. In another embodiment, flip top peripheral 99 and I/O peripheral 97 (FIG. 8) are simultaneously coupled to the same modular processing device such that the enterprise boots a full version of an operating system when the flip top is open and runs a modified version when closed that operates on minimal power and processing power.

In further embodiments, modular processing units are employed as MP3 players and/or video players. In other embodiments, a camera is employed as a peripheral and the images/video are preserved on the modular processing unit.

As provided above, embodiments of the present invention are extremely versatile. As further examples, processing control unit 40 may be used to physically support and/or provide processing to various fixtures or devices, such a lighting fixture (FIG. 12), an electrical outlet (FIG. 13), or a breaker box (FIG. 14). As provided herein, at least some embodiments of the present invention embrace a modular processing unit that functions as an engine that drives and controls the operation of a variety of components, structures, assemblies, equipment modules, etc.

Figure 12:
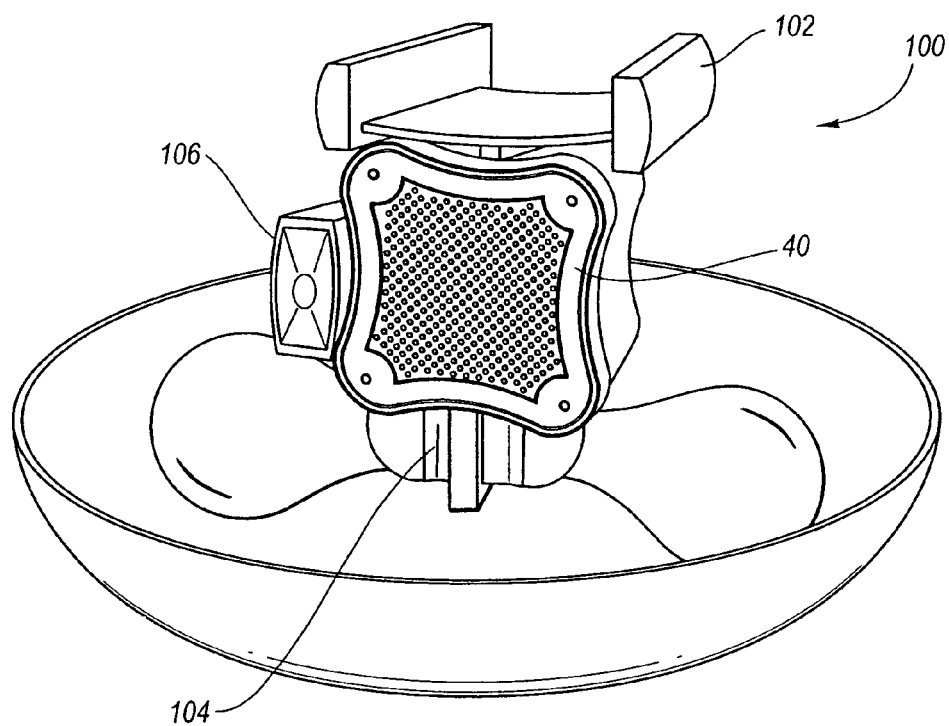
FIG. 12 provides a representative enterprise wherein a dynamically modular processing unit is employed in a representative consumer electrical device.

With reference now to FIG. 12, a representative enterprise is illustrated wherein a dynamically modular processing unit is employed in a representative consumer electrical device. In FIG. 12, modular processing unit 40 is incorporated a lighting fixture 100. For example, modular processing unit 40 may be used to control the on/off, dimming, and other attributes of lighting fixture 100, such as monitoring the wattage used by the bulb and alerting a control center of any maintenance required for lighting fixture 100 or any other desirable information. In the illustrated embodiment, modular processing unit 40 is mounted to a ceiling structure via slide-on mounting bracket 102 and to lighting fixture 100 using a mounting bracket slide-on lighting module 104 that is slid into slide receivers (not shown) located in the primary support body of modular processing unit 40. Lighting module 104 may support one or more light bulbs and a cover as shown. In the illustrated embodiment, modular processing unit 40 is also mounted to a slide on dimmer 194.

Figure 13:
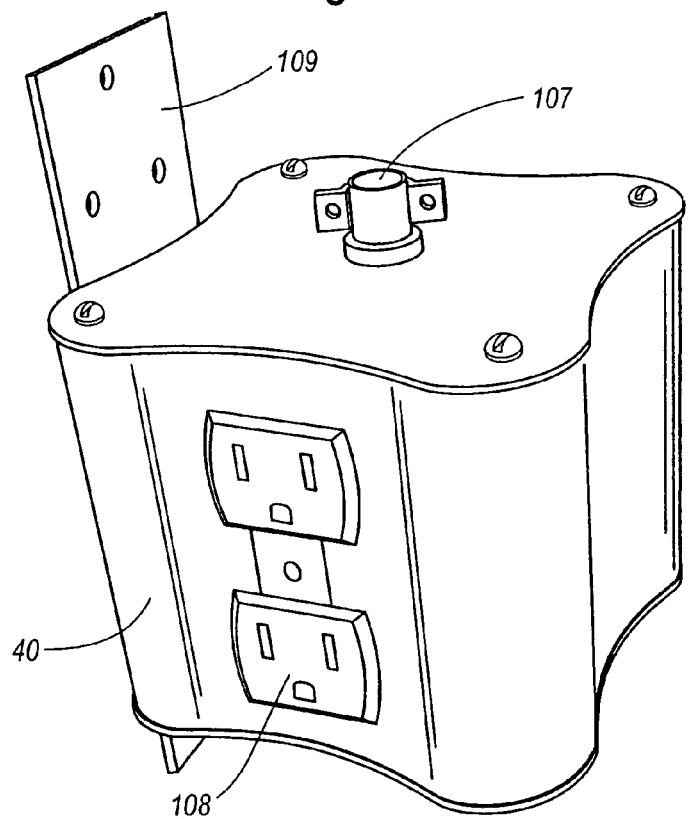
FIG. 13 provides another representative enterprise wherein a dynamically modular processing unit is employed in a representative electrical device.
Figure 14:
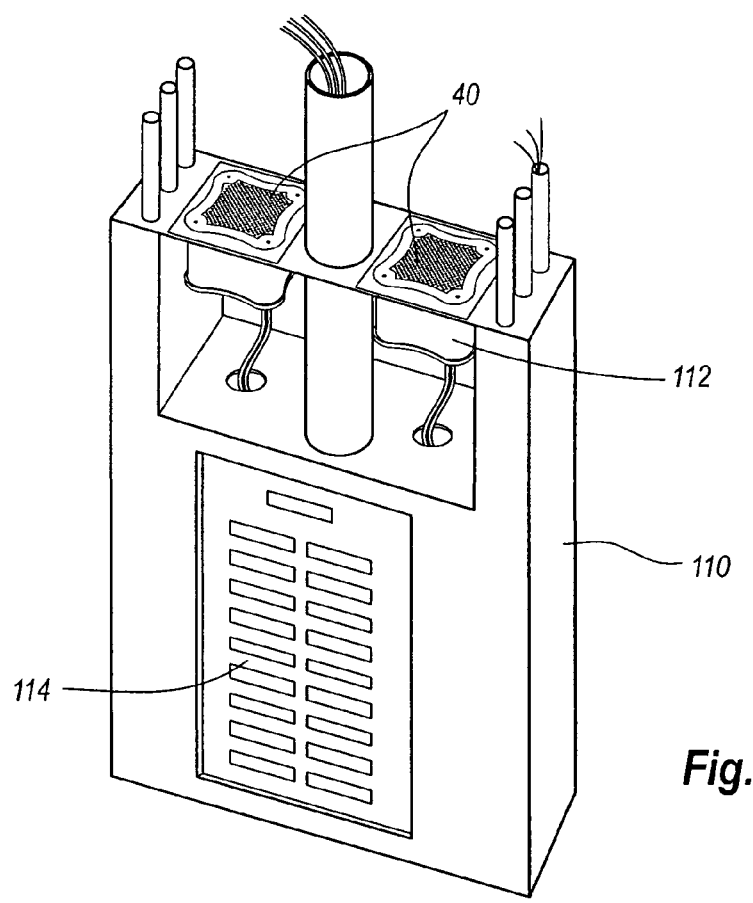
FIG. 14 provides a representative enterprise wherein one or more dynamically modular processing units are employed in another electrical device.

With reference to FIG. 13, a representative enterprise is illustrated, wherein a dynamically modular processing unit 40 having a non-peripheral based encasement is employed in another representative electrical device, wherein the representative device is an electrical outlet or plug that is used for 802.11x distribution. In FIG. 13, modular processing unit 40 is coupled to an AC interface 107, AC plug peripheral 108, and mounting bracket 109. AC plug peripheral 108 and mounting bracket 109 are slide-on peripherals. Modular processing unit 40 is powered by the ac distribution into unit 40 and is used as a smart plug to monitor, control, oversee, and/or allocate power distribution.

In one embodiment, unit 40 is utilized as a router. In another embodiment, unit 40 is employed as a security system. In another embodiment, unit 40 monitors electrical distribution and disconnects power as needed to ensure safety. For example, unit 40 is able to detect is an individual has come in contact with the electrical distribution and automatically shuts off the power. In some embodiments, technologies, such as X10 based technologies or other technologies, are used to connect multiple enterprises, such as the one illustrated in FIG. 13, over copper wire lines. In further embodiments, the multiple enterprises exchange data over, for example, a TCP/IP or other protocol.

Accordingly, embodiments of the present invention embrace the utilization of a modular processing unit in association with a mundane product to form a smart product. Although not exhaustive, other examples of products, systems and devices with a modular processing unit may be used to provide a smart product, system and/or device include a heating system, a cooling system, a water distribution system, a power distribution system, furniture, fixtures, equipment, gears, drills, tools, buildings, artificial intelligence, vehicles, sensors, video and/or audio systems, security systems, and many more products, systems and/or devices.

For example, a modular processing unit in association with a furnace may be used to control the efficiency of the furnace system. If the efficiency decreases, the modular processing unit may be programmed to provide the owner of the building, for example in an email communication, to change filters, service the system, identify a failure, or the like. Similarly, a modular processing unit may be used in association with a water supply to monitor the purity of the water and provide a warning in the event of contamination. Similarly, appliances (e.g., washers, dryers, dishwashers, refrigerators, and the like) may be made smart when used in association with a modular processing unit. Furthermore, the modular processing units may be used in association with a system that provides security, including detecting carbon monoxide, anthrax or other biological agents, radiological agents, or another agent or harmful substance. Moreover, due to the stability and versatility of the processing units, the modular processing units may be placed in locations previously unavailable. In at least some embodiments, the use of a modular processing unit with a super structure allows the modular processing unit to take on qualities of the super structure.

With reference now to FIG. 14, a representative enterprise is illustrated wherein one or more dynamically modular processing units are employed in another representative device, namely a voltage monitoring breaker box. In the illustrated embodiment, modular processing units 40 are used to transform a standard breaker box 114 into a voltage monitoring breaker box 110. Dual redundant modular processing units 40 function to process control breaker box 110 and monitor the voltage, in real-time, existing within breaker box 110 and throughout the house. Attached to each modular processing unit 40 is a voltage monitoring back plate 112, which attach using slide receivers. While the illustrated embodiment provides two modular processing units, those skilled in the art will appreciate that other embodiments embrace the use of one modular processing units or more than two processing units.

Figure 15:
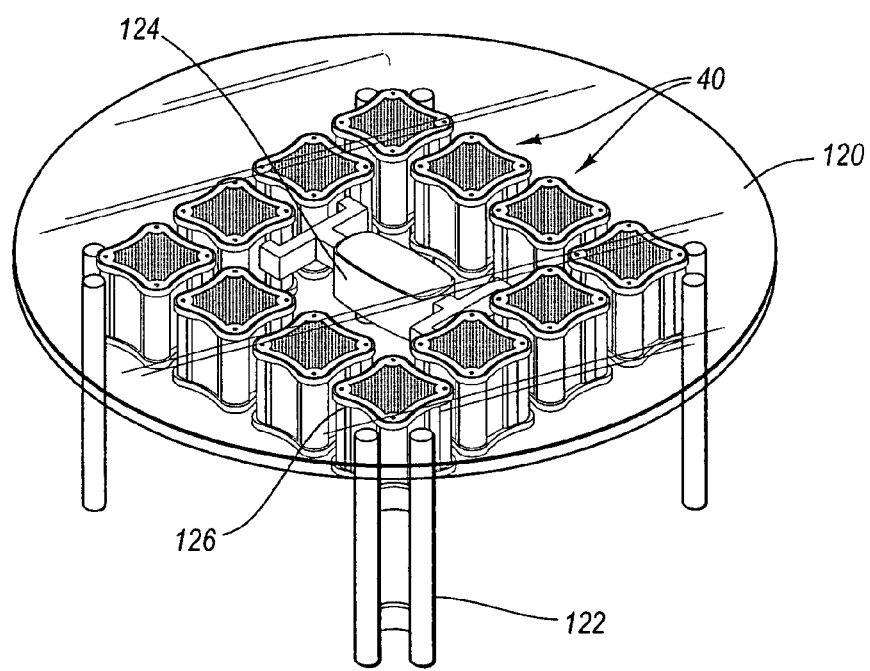
FIG. 15 provides a representative enterprise wherein one or more dynamically modular processing units are employed in another representative device.

With reference now to FIG. 15, another representative enterprise is illustrated wherein one or more dynamically modular processing units are employed in a representative device. In FIG. 15, modular processing units 40 are used in a load-bearing configuration of a table assembly 120, which employs slide-on leg mounts 122 that couple to respective slide receivers on corresponding modular processing units 40 to comprise the legs of table assembly 120. In the illustrated configuration, a plurality of modular processing units 40 is physically and electronically coupled together, and comprises the primary physical structure of table assembly 120. Also shown is a slide-on DVD and hard drive module 124 that allow table assembly 120 to perform certain functions. Also illustrated is a plurality of modular processing unit bearing connectors 126.

These illustrations are merely exemplary of the capabilities of one or more modular processing units in accordance with embodiments of the present invention. Indeed, one of ordinary skill in the art will appreciate that embodiments of the present invention embrace many other configurations, environments, and set-ups, all of which are intended to be within the scope of embodiments of the present invention.

Figure 16:
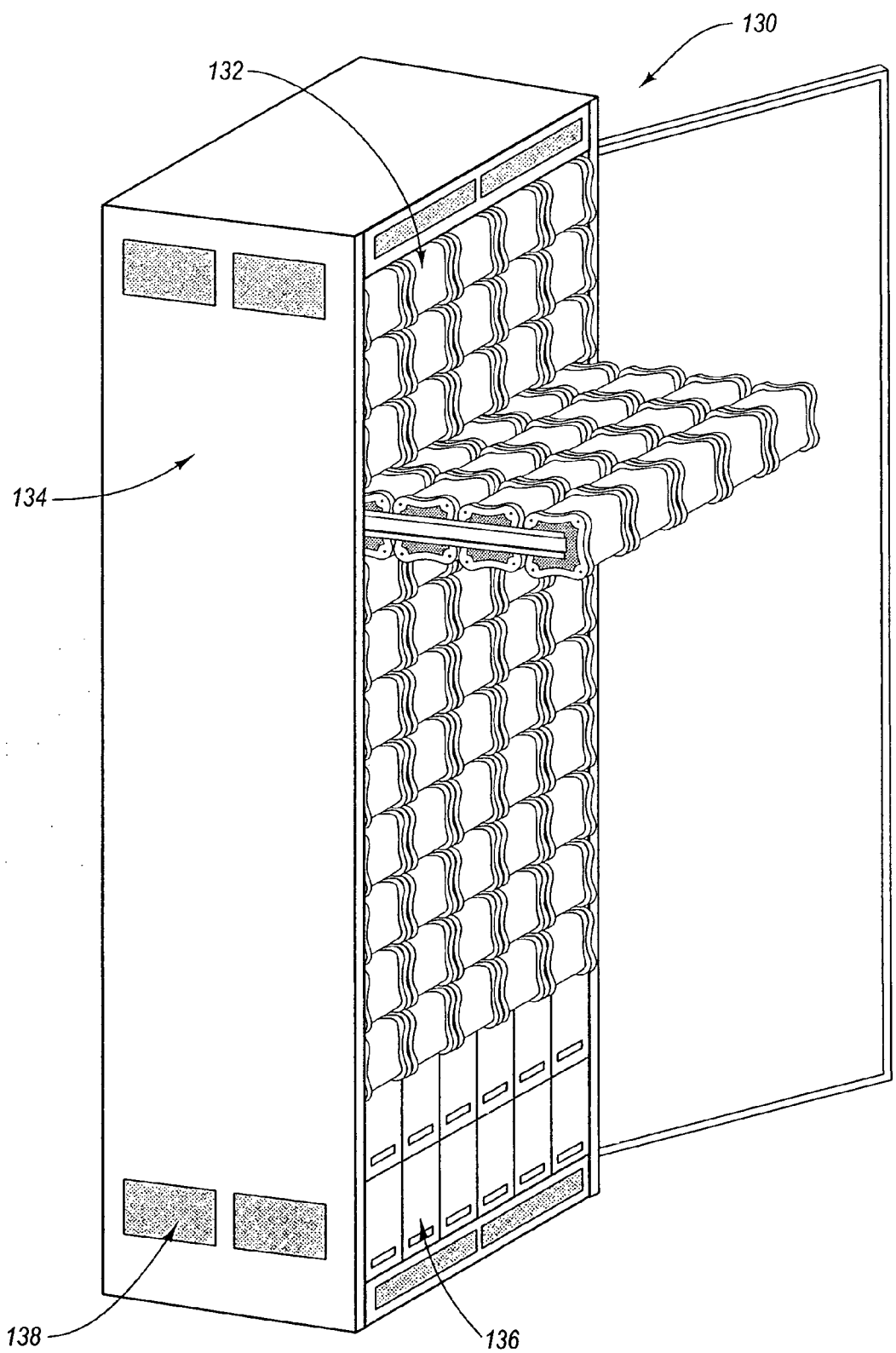
FIG. 16 provides a representative enterprise wherein multiple dynamically modular processing units, each having a non-peripheral based encasement, are oriented and employed in a computing enterprise to provide increased processing capabilities.

As provided herein, the dynamic and modular nature of the processing units allow for one or more processing units that may be used with all types of enterprises. With reference now to FIG. 16, enterprise 130 is a server array that is configured for server clustering and includes multiple dynamically modular processing units 132, each having a non-peripheral based encasement, which are housed in cabinet 134 and are available for use in processing data. In the illustrated embodiment, cabinet 134 includes drawers that receive modular processing units 132. Enterprise 130 further includes mass storage devices 136 for preserving data.

While FIG. 16 illustrates a cabinet that includes drawers configured to receive the individual processing units/cube, other embodiments of the present invention include the use of a mounting bracket that may be used in association with a processing unit/cube to mount the unit/cube onto a bar. The illustrated embodiment further includes a cooling system (not shown) that allows for temperature control inside of cabinet 134, and utilizes vents 138.

The modular nature of the processing units/cubes is illustrated by the use of the processing units in the various representative enterprises illustrated. Embodiments of the present invention embrace chaining the units/cubes in a copper and/or fiber channel design, coupling the cubes in either series or parallel, designating individual cubes to perform particular processing tasks, and other processing configurations and/or allocations.

Each unit/cube includes a completely re-configurable motherboard. In one embodiment, the one or more processors are located on the back plane of the motherboard and the RAM modules are located on planes that are transverse to the back plane of the motherboard. In a further embodiment, the modules are coupled right to the board rather than using traditional sockets. The clock cycle of the units are optimized to the RAM modules.

While one method for improving processing powering an enterprise includes adding one or more additional processing units/cubes to the enterprise, another method includes replacing planes of the motherboard of a particular unit/cube with planes having upgraded modules. Similarly, the interfaces available at each unit/cube may be updated by selectively replacing a panel of the unit/cube. Moreover, a 32-bit bus can be upgraded to a 64-bit bus, new functionality can be provided, new ports can be provided, a power pack sub system can be provided/upgraded, and other such modifications, upgrades and enhancements may be made to individual processing units/cubes by replacing one or more panels.

Thus, as discussed herein, embodiments of the present invention embrace systems and methods for providing a dynamically modular processing unit. In particular, embodiments of the present invention relate to providing a modular processing unit that is configured to be selectively oriented with one or more additional units in an enterprise. In at least some embodiments, a modular processing unit includes a non-peripheral based encasement, a cooling process (e.g., a thermodynamic convection cooling process, a forced air cooling process, and/or a liquid cooling process), an optimized layered printed circuit board configuration, optimized processing and memory ratios, and a dynamic back plane that provides increased flexibility and support to peripherals and applications.

The present invention may be embodied in other specific forms without departing from its spirit or essential characteristics. The described embodiments are to be considered in all respects only as illustrative and not restrictive. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A dynamic modular processing system, comprising:
   a processing unit comprising:
      a processor operably coupled to a circuit board;
      a bus system interposedly connected to a coupling interface and the circuit board;
   a first peripheral module interchangeably coupled to the coupling interface; and
   a second peripheral module interchangeably coupled to the coupling interface following removal of the first peripheral module from the coupling interface, wherein the coupled first and second peripheral modules are operably connected to the processor via the coupling interface, the bus system, and the circuit board.

2. The system of claim 1, further comprising a plurality of peripheral modules each solely and interchangeably coupled to the coupling interface of the processing unit.

3. The system of claim 1, further comprising an interchangeable back plane, wherein the coupling interface forms a portion of the interchangeable backplane.

4. The system of claim 1, wherein the first and second peripheral modules include at least one of:
   (i) a mass storage device;
   (ii) a peripheral input device;
   (iii) a peripheral output device;
   (iv) a network interface;
   (v) a second processing unit;
   (vi) a proprietary input connection;
   (vii) a proprietary output connection; and
   (viii) a proprietary device.

5. The system of claim 1, wherein the processing unit is used in conjunction with a peripheral module selected from the group consisting of:
   (i) a personal computer;
   (ii) a notebook computer;
   (iii) a personal digital assistant;

(iv) a handheld device;
(v) a workstation;
(vi) a minicomputer;
(vii) a mainframe;
(viii) a processor-based consumer device;
(ix) a smart device; and
(x) a control system.

6. The system of claim 1, wherein the circuit board comprises a plurality of circuit boards.

7. The system of claim 1, further comprising memory coupled to the bus and within the processing unit.

8. A method for providing a dynamic modular processing system, comprising:
  providing a processing unit comprising:
    a processor coupled to a circuit board;
    a bus system; and
    a coupling interface;
  providing a first peripheral module that is interchangeably coupled to the coupling interface; and
  providing a second peripheral module that is interchangeably coupled to the coupling interface following removal of the first peripheral module from the coupling interface, wherein the first and second peripheral modules are operably coupled to the processor via the coupling interface, the bus system, and the circuit board.

9. The method of claim 8, wherein the optimized circuit board comprises a plurality of circuit boards.

10. The method of claim 8, wherein the first and second peripheral modules include at least one of:
  (i) a mass storage device;
  (ii) a peripheral input device;
  (iii) a peripheral output device;
  (iv) a network interface;
  (v) a second processing unit;
  (vi) a proprietary input connection;
  (vii) a proprietary output connection; and
  (viii) a proprietary device.

11. The method of claim 8, wherein the processing unit is coupled with a peripheral module selected from the group consisting of:
  (i) a personal computer;
  (ii) a notebook computer;
  (iii) a personal digital assistant;
  (iv) a handheld device;
  (v) a workstation;
  (vi) a minicomputer;
  (vii) a mainframe;
  (viii) a processor-based consumer device;
  (ix) a smart device; and
  (x) a control system.

12. A modular system, comprising:
  a processing unit comprising:
    a processor operably coupled to a circuit board;
    a bus system interposedly connected to an externally accessible coupling interface and the circuit board; and
  a peripheral device selectively coupled to the coupling interface of the processing unit, wherein the peripheral device is operably coupled to the processor via the coupling interface, the bus system, and the circuit board.

13. The system of claim 12, further comprising a plurality of interchangeable peripheral devices that are selectively connected to the coupling interface.

14. The system of claim 12, wherein the peripheral device comprises at least one of:
  (i) a mass storage device;
  (ii) a peripheral input device;
  (iii) a peripheral output device;
  (iv) a network interface;
  (v) a second processing unit;
  (vi) a proprietary input connection;
  (vii) a proprietary output connection;
  (viii) a proprietary device; and
  (ix) a storage device.

* * * * *